United States Patent
Rogers et al.

(10) Patent No.: US 7,514,617 B2
(45) Date of Patent: Apr. 7, 2009

(54) PRACTICE DRUMHEAD ASSEMBLY

(75) Inventors: Thomas P. Rogers, Edgewater, NJ (US); Raymond F. Gastgeb, Doylestown, PA (US)

(73) Assignee: RTOM Corporation, Carlstadt, NJ (US)

( * ) Notice: Subject to any disclaimer, the term of this patent is extended or adjusted under 35 U.S.C. 154(b) by 210 days.

(21) Appl. No.: 11/335,114

(22) Filed: Jan. 19, 2006

(65) Prior Publication Data

US 2007/0163422 A1 Jul. 19, 2007

(51) Int. Cl.
*G10D 13/02* (2006.01)

(52) U.S. Cl. .................. 84/411 P; 84/411 A; 84/414; 84/414 R

(58) Field of Classification Search ............. 84/411 P, 84/411 A, 414, 411 R
See application file for complete search history.

(56) References Cited

U.S. PATENT DOCUMENTS

| | | | |
|---|---|---|---|
| 635,192 A | 10/1899 | Sapp | |
| 729,936 A * | 6/1903 | Heybeck | 84/414 |
| 1,072,687 A * | 9/1913 | Beauregard | 38/102.2 |
| 1,634,151 A * | 6/1927 | Lannon et al. | 92/202 |
| 1,789,992 A * | 1/1931 | Stevens | 84/411 R |
| 3,105,406 A * | 10/1963 | Ippolito | 84/411 R |
| 3,283,909 A * | 11/1966 | Daubman | 210/380.1 |
| 3,453,924 A * | 7/1969 | Glick et al. | 84/411 R |
| 3,596,385 A * | 8/1971 | Tachibana | 38/102.2 |
| 3,867,863 A * | 2/1975 | Vennola et al. | 84/420 |
| 4,102,235 A * | 7/1978 | Le Masters | 84/411 R |
| 4,244,266 A | 1/1981 | Hardy | |
| 4,325,280 A | 4/1982 | Hardy | |
| 4,549,462 A | 10/1985 | Hartry et al. | |
| 4,589,323 A | 5/1986 | Belli et al. | |
| 4,726,130 A * | 2/1988 | Bussard | 38/102.2 |
| 4,745,839 A | 5/1988 | Peraino | |
| 4,770,918 A * | 9/1988 | Hayashi | 428/113 |
| 4,828,907 A * | 5/1989 | Hayashi | 442/217 |
| 4,927,290 A * | 5/1990 | Bowman | 404/26 |
| 4,976,719 A * | 12/1990 | Siepser | 606/151 |
| 5,025,697 A * | 6/1991 | May | 84/411 R |
| 5,042,356 A * | 8/1991 | Karch | 84/725 |
| 5,151,150 A * | 9/1992 | Davis et al. | 156/394.1 |
| 5,316,407 A * | 5/1994 | Miller | 404/25 |
| 5,392,681 A | 2/1995 | Hall | |
| 5,404,784 A * | 4/1995 | Steenbock | 84/411 M |
| 5,492,047 A * | 2/1996 | Oliveri | 84/411 M |

(Continued)

OTHER PUBLICATIONS

Rule, Greg and Fisher, Steve, How Roland became the Biggest Drum Company in the World, V-Drums with Mesh Drum Heads. See patent 5,920,026 by Yoshino. 1997, viewed May 15, 2008.(Roland Mesh Head) http://www.rolandus.com/community/insider/hands_on_articles.aspx?ArticleId=21.*

(Continued)

*Primary Examiner*—Walter Benson
*Assistant Examiner*—Robert W Horn
(74) *Attorney, Agent, or Firm*—Hedman & Costigan, P.C.

(57) ABSTRACT

A practice drumhead assembly including a mesh membrane held in substantially fixed relation to an acoustic membrane. The assembly preferably includes an annular tensioning ring for tensioning the mesh membrane, and an engagement member for substantially fixing the mesh membrane relative to the acoustic membrane. The tensioning ring includes a cylindrical rod with a turnbuckle that is rotated to increase the diameter of the tensioning ring.

25 Claims, 6 Drawing Sheets

U.S. PATENT DOCUMENTS

| | | | |
|---|---|---|---|
| 5,493,942 A * | 2/1996 | Wolf | 84/411 R |
| 5,561,254 A | 10/1996 | Huffer | |
| 5,708,045 A | 1/1998 | Thompson et al. | |
| 5,892,169 A * | 4/1999 | Shapiro | 84/411 M |
| 5,920,026 A * | 7/1999 | Yoshino et al. | 84/738 |
| 5,962,798 A * | 10/1999 | Meinl | 84/418 |
| 5,998,716 A * | 12/1999 | Marquez et al. | 84/411 P |
| 6,043,419 A | 3/2000 | Arbiter | |
| 6,069,307 A | 5/2000 | Rogers | |
| 6,150,594 A * | 11/2000 | Fiondella et al. | 84/411 R |
| 6,291,754 B1 | 9/2001 | Gatzen et al. | |
| 6,518,490 B2 * | 2/2003 | Good | 84/414 |
| 6,525,249 B1 * | 2/2003 | Suenaga | 84/411 R |
| 6,586,665 B1 * | 7/2003 | Liao et al. | 84/411 R |
| 6,784,352 B2 * | 8/2004 | Suenaga | 84/411 R |
| 6,921,857 B2 * | 7/2005 | Yoshino et al. | 84/738 |
| 7,135,630 B2 | 11/2006 | Maruhashi et al. | |
| 2003/0136245 A1 * | 7/2003 | Okumura | 84/411 R |
| 2006/0065099 A1 | 3/2006 | Anderson | |
| 2007/0022863 A1 | 2/2007 | Ross | |
| 2007/0051231 A1 * | 3/2007 | Fujii | 84/723 |

OTHER PUBLICATIONS

Pearl, Muffle Head, viewed May 15, 2008, http://www.steveweissmusic.com/product/30359/mesh-drum-heads.*
Electronic Studion Drum Kit 2002, featuring mesh drum heads by Pearl http://www.buxjr.com/wwwdrums/, viewed May 15, 2008.*
Roland Mesh Head Replacements, http://www.musiciansfriend.com/product/Roland-MH12-Mesh-VReplacement-Head-12?sku=441908, viewed May 15, 2008.*
Nternational Preliminary Report on Patentability With Written Opinion of the International Searching Authority (Jul. 22, 2008).

* cited by examiner

PRACTICE DRUMHEAD ASSEMBLY

FIELD OF THE INVENTION

The present invention relates to the field of musical drums and more particularly to the field of devices for practicing the playing of musical drums.

BACKGROUND OF THE INVENTION

Musical drums are generally comprised of a shell and one or two tunable membranes locked into an annular frame, generally referred to as a drumhead, which is tensioned over the shell.

To provide the proper tension to the drumhead, the shell has an arrangement of tensioning lugs attached to it, with threaded tension rods extending from the tensioning lugs. During installation the drumhead is placed over the shell and a counter hoop is placed over the annular frame of the drumhead. The tension rods engage the counter hoop and are tightened to stretch the drumhead membrane. By adjusting the torque of the tension rods within the tensioning lugs, the stretched drumhead membrane changes pitch.

More particularly, the tensioning lug, tension rod and counter hoop arrangement is a system that is designed to apply force to a drumhead, typically in a uniform manner, to stretch the drumhead membrane over the shell. By tightening the tensioning lugs, the tension rods pull on the counter hoop to tension the drumhead membrane thereby increasing the pitch when struck. Conversely, loosening the tensioning lugs permits the tension rods to release tension on the counter hoop thereby lowering the pitch of the drumhead membrane when struck.

As such, the stretching of the drumhead membrane to the desired tension is what gives the drum its musical and playing characteristics, including pitch, stick rebound, etc. The tone of the drum and the stick rebound, usually referred to as the "feel" of the drum, are determined by the drumhead diameter, its tension and the thickness of the drumhead membrane.

To date only several apparatus have been used to practice playing an acoustic drum without generating the loud sound levels associated with playing a drum. One such apparatus is a disc of foam or rubber placed over the top of the drumhead membrane. The foam or rubber disc absorbs the force of a drumstick striking the disc and muffles its sound. However, the foam or rubber disc eliminates the natural rebound of the drumstick striking a drumhead membrane and substantially deafens the tone of the drum. As such, use of a foam or rubber device is more like practicing on cardboard boxes.

Another drum practice device designed for simulating drumhead tension when practicing playing acoustic musical drums is described in U.S. Pat. No. 6,069,307 to Rogers. This device, however, requires the use of a custom fabricated drumhead and an inflatable bladder to create a tensioned practice drum. As such, the tensioned device of U.S. Pat. No. 6,069,307 is complex and expensive to produce.

It is therefore an object of the present invention to provide a drum practice device that is very quiet but maintains the feel of a drumhead and preserves much of the sound characteristics of the drum on which it is used.

It is a further object of the invention to provide such a drum practice device that can be removably attached to an acoustic drum easily and without damaging the drum or made as a self contained drum practice device with its own drumhead and practice drumhead.

SUMMARY OF THE INVENTION

These and other objects are achieved by the present invention which is directed to a practice drumhead assembly comprising a practice drumhead having a mesh membrane, or open weave, and an annular frame, an annular tensioning ring for tensioning the mesh membrane, and an engagement member for substantially fixing the practice drumhead relative to an acoustic, or resonant, drum membrane of an acoustic drumhead.

In one embodiment the engagement member attaches the practice drumhead in substantially fixed relation to the acoustic drumhead on a standard drum shell having a counter hoop placed over the annular ring of the acoustic drumhead and a series of tensioning lugs with tension rods on the shell that engage the counter hoop to tension the acoustic drumhead over the shell. In this embodiment the engagement member includes a retention member for retaining an annular frame of the practice drumhead and a connection member for connecting the practice drumhead assembly to the acoustic drum.

The connection member in this embodiment can connect to any part of the acoustic drum as long as the mesh practice drumhead is maintained in substantially fixed relation to the acoustic drumhead. For example, the connection member can attach to the annular ring of the acoustic drumhead, to the counter hoop, to the tensioning lugs, tension rods, shell, etc., of a standard acoustic drum.

Alternatively, the acoustic drumhead can be free from a standard acoustic drum. In this embodiment, the connection member of the engagement member connects to the acoustic drumhead directly, preferably by connecting to the annular ring of the acoustic drumhead.

It is preferred that at least a portion of the connection member for connecting the practice drumhead assembly to the acoustic drum and/or drumhead be formed of an elastomeric material, and most preferably of rubber. The use of a connecting member formed at least in part of an elastomeric material is preferred to provide an easily removable means for connection of the practice drumhead assembly to the acoustic drum that will not interfere with or damage the drum. Most preferably, the entire engagement member, including the connection member, is formed of an elastomeric material.

The annular tensioning ring can be any device which assists in creating tension across the mesh membrane of the practice drumhead. Preferred, however, is an annular ring that can be placed inside of the practice drumhead mesh membrane to tension the mesh membrane from the inside outward. The preferred tensioning ring comprises an expansion mechanism, such as a turnbuckle, that can be operated to expand the diameter of the tensioning ring to tune the mesh membrane of the practice drumhead.

As used herein, a "mesh" membrane refers to a permeable membrane, having an open weave with openings through which air can pass. This is the antithesis of a solid, acoustic or resonant membrane, as used in acoustic drumheads. The sound energy or volume of the output from a mesh membrane can be far less than the sound energy generated by an acoustic membrane. This reduced output from the mesh membrane allows the player to experience practice on a tensioned surface similar to that of the acoustic solid membrane drumheads with greatly reduced sound energy output.

However, when the mesh membrane is retained in close proximity to the acoustic membrane of the drum, the vibrations of the mesh membrane cause a sympathetic vibration response from the acoustic membrane. When the practice membrane and the drum membrane are similarly tensioned, sympathetic vibration of the acoustic membrane from the mesh membrane creates a low volume sound response with substantially the same pitch and tone as that of the acoustic membrane.

An analogy would be bringing a vibrating tuning fork close to a non-vibrating tuning fork of the same predetermined pitch. As the vibrating tuning fork A is moved closer to the non-vibrating tuning fork B, the vibrating tuning fork A will cause the non-vibrating fork to begin to sympathetically vibrate. As tuning fork A moves closer to tuning fork B, the output from tuning fork B will increase. In other words, the open air between tuning fork A and tuning fork B makes for a poor medium, but as the tuning forks are brought closer together the air gap is overcome by the energy level of tuning fork A.

The open percentage of the mesh membrane is one variable that affects the characteristics of the practice drumhead. The more open area, the less air will be moved when the mesh membrane is struck, affecting both the amount of sound energy generated by the mesh membrane as well as the "coupling" with the acoustic membrane.

The "coupling" is the level of response of the acoustic membrane to the mesh membrane when the mesh membrane is struck. Factors affecting the coupling include the open area of the mesh membrane, the tuning of the mesh membrane, the frequency of the vibration and the distance between the mesh membrane and the acoustic membrane. For a maximum amount of coupling with a high open area mesh membrane, the resonance of the two membranes should be the same.

If the mesh membrane has a greater open area, i.e., a higher ratio of open to closed area, and it is tuned significantly out of pitch with the acoustic membrane, one would see poor coupling and virtually no output from the acoustic membrane. Returning to the tuning fork analogy, if the vibrating tuning fork A is substantially different in pitch than tuning fork B, there would be little sympathetic vibration no matter how close vibrating tuning fork A is placed to non-vibrating tuning fork B. Therefore, the practice drumhead must not only be sufficiently close to but also must be properly tuned to the acoustic drumhead membrane to properly provide a low volume replication of sound from the acoustic membrane.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION OF THE PREFERRED EMBODIMENT

Figure 1:
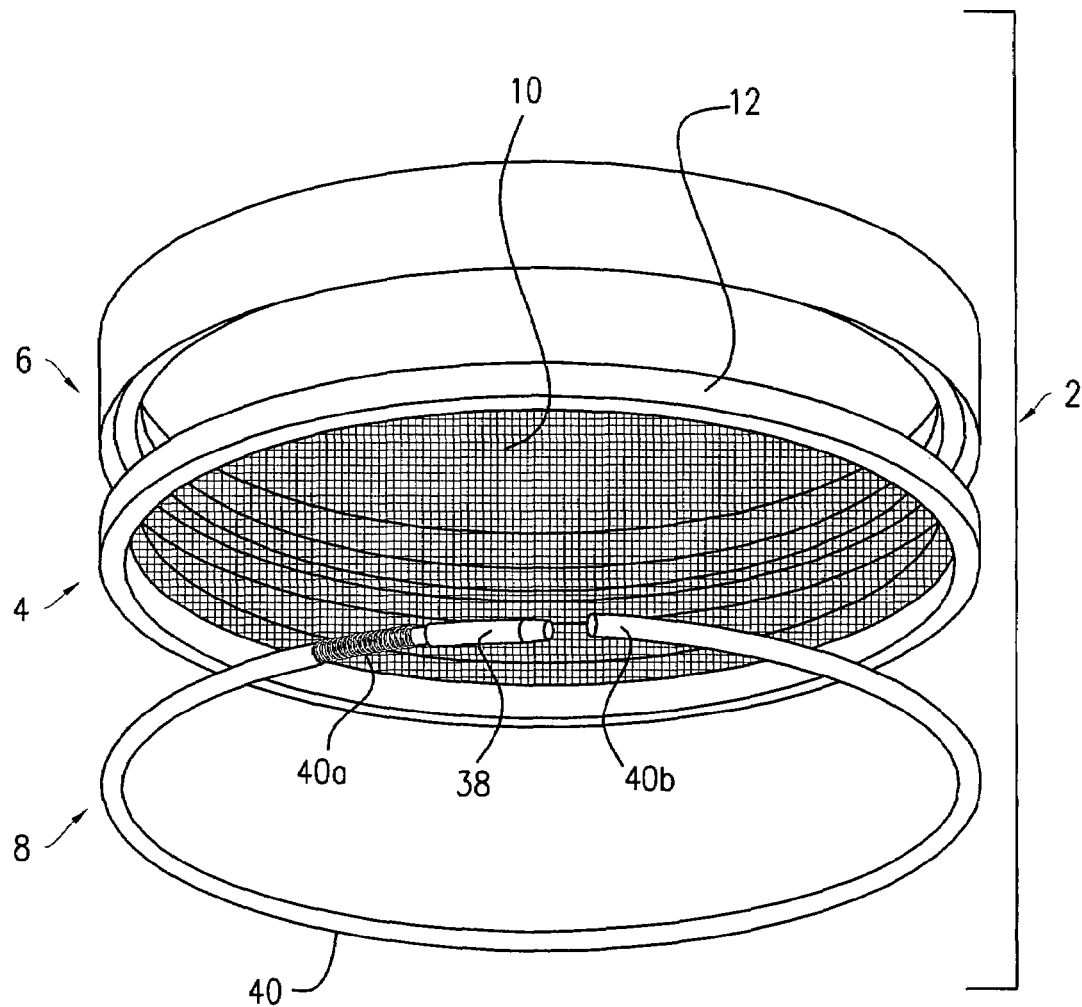
FIG. 1 is an exploded view of the practice drumhead assembly of the present invention.

As shown in the drawings, and particularly FIG. 1, the present invention is directed to a practice drumhead assembly 2 comprising a practice drumhead 4, an engagement member 6 for maintaining the practice drumhead 4 in substantially fixed relation to an acoustic membrane and an annular tensioning ring 8 for creating tension across a mesh membrane 10 of the practice drumhead 4. The practice drumhead assembly 2 replicates the feel of an acoustic drumhead membrane but at a greatly reduced volume.

The mesh membrane 10 of the practice drumhead 4 is preferably locked into an annular frame 12 by means well known in the art of manufacturing drumheads, including such means as adhering the edge of the membrane 10 into the annular frame 12 with a resin or the like, clamping the edge of the membrane 10 in the annular frame 12, etc. Although the mesh membrane 10 can be fashioned of any suitable material known for making drumheads, having an open weave, a polyester material from about 5 to about 20 mil thick, such as that sold by Dupont under the trademark MYLAR®, is preferred.

The mesh practice membrane 10 of the practice drumhead assembly 2 is permeable to air, preferably having a about 25 to about 75% open area in the membrane 10, and most preferably about 30%. As set forth above, it will be understood by those skilled in the art that the amount of open area of the mesh material used to form the mesh membrane 10 will affect the characteristics of the practice assembly 2. The less open area in the mesh membrane 10, the more air movement created when the mesh membrane 10 is struck. All else being equal, the more air movement created, the more sound energy will be generated, resulting in a higher volume during practice.

Although more air movement results from a mesh membrane 10 with less open area, the effect on the acoustic membrane 20 when the mesh membrane 10 is struck is also dependent on the distance between the mesh membrane 10 and the acoustic membrane 20. Coupling will be improved despite the open area of the mesh membrane 10 if the mesh membrane 10 is closer to the acoustic membrane 20. Therefore, although a mesh membrane 10 with greater open area will produce less sound energy when struck, a closer distance between the mesh membrane 10 and the acoustic membrane 20 will create greater sound energy.

Figure 2:
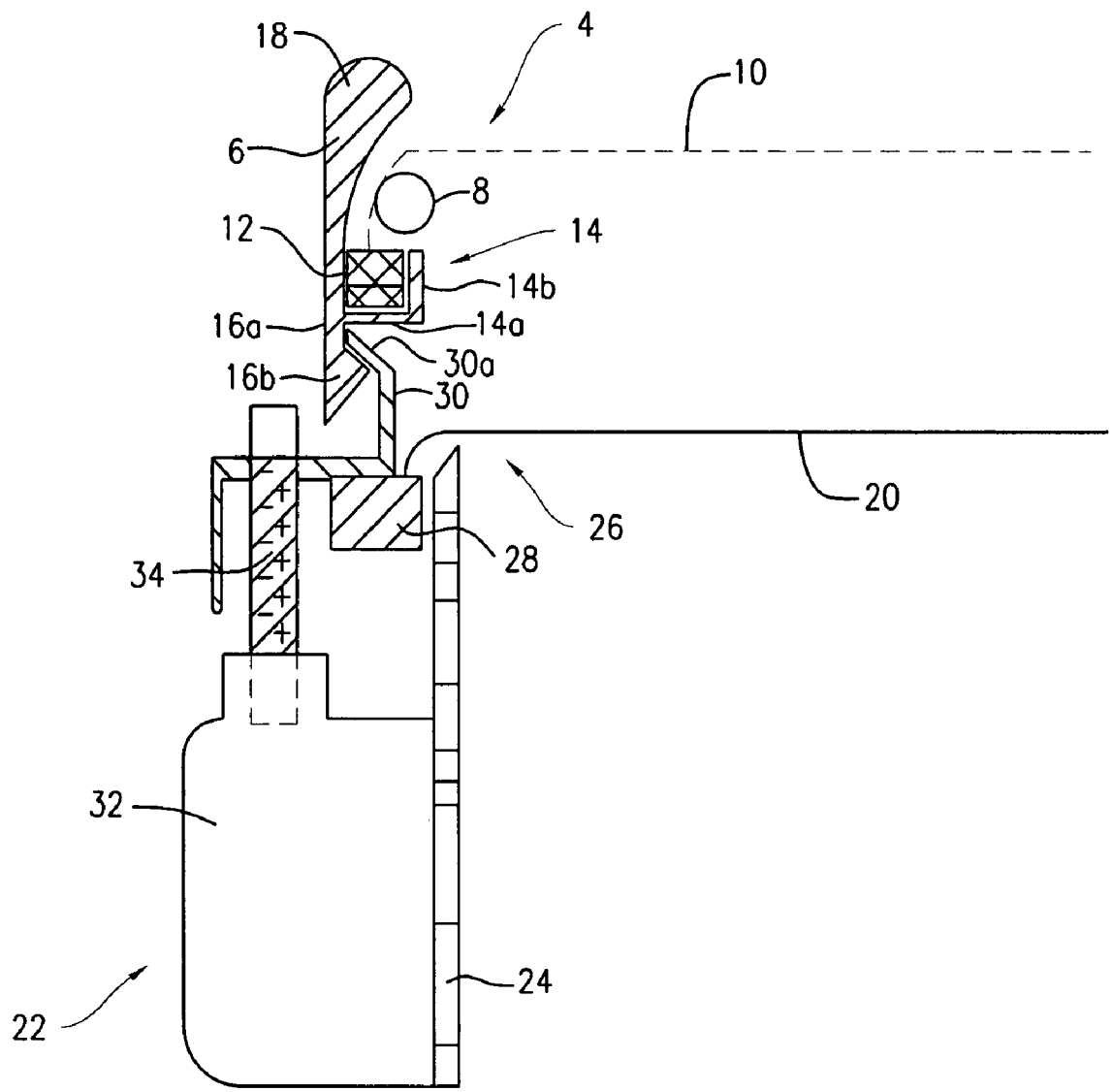
FIG. 2 is a cross sectional view of the practice drumhead assembly of the present invention with a first engagement configuration for mounting the practice drumhead on an acoustic drum.

Drawing FIG. 2 more clearly shows the arrangement of a preferred practice drumhead assembly 2 and its relationship to an acoustic drum 22.

As shown in FIG. 2, a typical acoustic musical drum 22 includes a shell 24, an acoustic drumhead 26 comprising an acoustic membrane 20 and an annular ring 28 for mounting the acoustic drumhead 26 on the shell, a counter hoop 30 placed over the annular ring 28 of the acoustic drumhead 26 and a series of tensioning lugs 32 with tension rods 34 on the shell 24 which engage the counter hoop 30 to tension the acoustic drumhead 26 over the shell 24.

In the practice drum assembly 2, the practice drumhead 4 is substantially fixed in relation to the acoustic membrane 20 of the drum 22 using an engagement member 6. The engagement member 6 comprises a retention member 14 for retaining the practice drumhead 4 on the engagement member 6, a connection member 16 for connecting the practice drumhead assembly 2 to the acoustic drum 22 and, preferably, an upper stop 18.

It is understood that any structure suitable for retaining the practice drumhead 4 on the engagement member 6 may be used as the retention member 14. In the preferred embodiment shown in FIG. 2, the retention member 14 includes a floor 14a extending from the inner wall of the engagement member 6, inwardly toward the center of the engagement member 6, and a face 14b extending upwardly from the floor 14a. In this embodiment, the annular frame 12 of the practice drumhead 4 fits securely on the floor 14a and between the inner wall of the engagement member 6 and the face 14b.

Preferably, the retention member 14 runs about the entire interior wall of the engagement member 6, however, the preferred retention member 14 shown in the drawings can be formed along discrete portions of the inner wall as well.

The preferred upper stop 18 of the engagement member 6 extends inwardly over the edge of the practice drumhead 4 to assist in securely retaining the practice drumhead 4 in the engagement member 6. In its preferred embodiment, the upper stop 18 runs about the perimeter of the engagement member 6 and is made of an elastomeric material, preferably formed integrally with the rest of the engagement member 6.

The connection member 16 of the engagement member 6 acts to connect the practice drumhead assembly 2 to the acoustic drum 22. As such, any structure that can connect the practice drumhead 4 in substantially fixed relation to the acoustic membrane 20 may be used. However, the preferred connection member 16 shown in the drawings comprises a wall portion 16a, which fits around at least a portion of the upper outwardly extending perimeter 30a of the counter hoop 30, and a catch 16b that extends inwardly below the outwardly extending perimeter 30a of the counter hoop 30.

In this preferred embodiment, at least a portion of the connection member 16 is formed of an elastomeric material. This provides that at least a portion of the connection member 16 can be stretched over the outwardly extending perimeter 30a of the counter hoop 30, so that the catch 16b is seated below the perimeter 30a when properly connected.

Most preferably, however, the entire engagement member 6 is formed of an elastomeric material, most preferably rubber, which fits securely around the counter hoop 30 of the acoustic drum 22 and retains the practice drumhead 4 therein. The elastomeric engagement member 6 provides certain benefits with respect to both the retention of the practice drumhead 4 and the connection to the acoustic drum 22.

More specifically, the elastomeric engagement member 6 allows for the easy insertion and removal of the practice drumhead 4 by deforming the area adjacent the upper stop 18 outwardly while moving the annular frame 12 down into the retention member 14. Similarly, the elastomeric engagement member 6 provides ease of installation and removal of the practice drumhead assembly 22 onto and off of the acoustic drum 22 by deforming the connection member 16 in the area of the thin wall 16a outwardly to slip the catch 16b over the perimeter 30a of the counter hoop 30.

In this regard, the most preferred rubber engagement member 6 acts like a rubber band stretched around the practice drumhead 4 and the counter hoop 30 of the acoustic drum 22. Using such an elastomeric material, the practice drum assembly 2 can be attached to and removed from the acoustic drum 22 without damage to the acoustic drum 22.

In the preferred embodiments shown and described herein, the tensioning ring 8 is a cylindrical rod 40 formed in an annular configuration with an expansion member 38 forming a part thereof. The expansion member 38 is preferably a turnbuckle, as shown in FIGS. 1 and 3, which is as near as possible to the diameter of the rod 40 of the tensioning ring 8, or some other expansion means to permit annular expansion.

Figure 3:
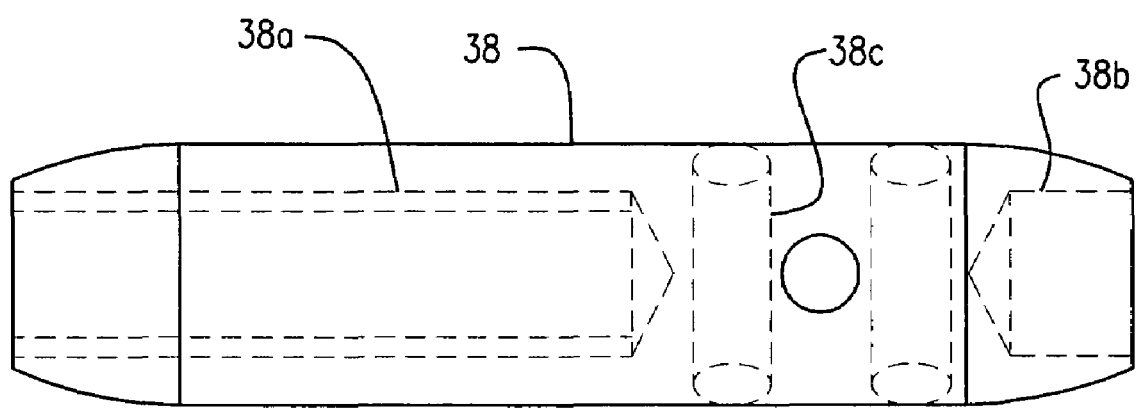
FIG. 3 is a schematic view of a turnbuckle for expanding the tension ring of the practice drumhead assembly of the present invention.

As best seen in FIG. 3, the preferred expansion member 38 includes a threaded receptacle 38a at one end for receiving a threaded end 40a of the rod 40 of the tensioning ring 8. The other end of the expansion member 38 includes a smooth receptacle 38b for receiving a smooth end 40b of the rod 40. Between the receptacles is a spring 38c to provide some give to the expansion member 38.

Either before or after the practice drumhead 4 is retained on the engagement member 6, the preferred tensioning ring 8 is placed inside the mesh membrane 10 of the practice drumhead 4 and is expanded outwardly to create tension on the mesh membrane 10.

For installation of the preferred tensioning ring 8, the smooth end 40b of the rod 40 is inserted in the smooth receptacle 38b and the threaded end 40a of the rod 40 is fully inserted into the threaded receptacle 38a. The tensioning ring 8 is then placed within the mesh membrane 10 of the practice drumhead 4 and the expansion member 38 rotated to expand the tensioning ring 8. Upon rotation of the expansion member 38, the threaded end 40a cooperates with the threaded receptacle 38a to force the tensioning rod 40 outward, thereby expanding the diameter of the tensioning ring 8.

As set forth above, the mesh membrane 10 of the practice drumhead 4 should be tuned as near as possible to the frequency as the acoustic membrane 20. This can be achieved by adjusting the diameter of the tensioning ring 8 through rotation of the expansion member 38.

Using the preferred engagement member 6 and tensioning ring 8, the practice drumhead assembly 2 of the present invention is only slightly larger than that of a conventional drumhead. Of course, other suitable structure for tensioning the mesh membrane 10 of the practice drumhead 4 can be used without deviating from the spirit of the present invention.

As set forth above, because the open weave mesh membrane 10 is used as the striking or "playing" surface of the practice drumhead assembly 2, it by itself generates little acoustic sound. However, the close proximity of the mesh membrane 10 to the acoustic membrane 20 (which would be a solid membrane which generates acoustical sound) creates the sympathetic vibration of the acoustic membrane 20 when the mesh membrane 10 is struck.

As such, substantially fixing the mesh membrane 10 at a height near the acoustic membrane 20, without being so close as to permit the two membranes to touch when the mesh membrane 10 is struck, will result in a sympathetic sound of lower volume than if the acoustic membrane 20 were struck. It has been found that when using a mesh membrane 10 with about 25 to about 75% open area, a distance of from about 0.5 to about 4 inches is preferred for practicing the present invention, with a distance of from about 0.5 to about 3 inches being most preferred.

The present invention can be adapted to virtually any size acoustic drum, with modifications to the size of the practice drumhead 4, engagement member 6 and tensioning ring 8. For example, an 18 inch diameter acoustic drum could have an 18 inch practice drumhead 4, an engagement member 6 just over 18 inches to accept the 18 inch practice drumhead 4 and fit securely about the counter hoop 30 of the 18 inch drum and a tensioning ring which can expand from about 17.5 to about 18.5 inches in diameter.

Although the distance between the mesh membrane 10 and the acoustic membrane 20 would be similar for the various size drums, the diameter of the rod 40 of the tensioning ring 8 may be thicker for larger sized drums, to ensure that the proper tension can be applied. One skilled in the art, however, can easily determine these dimensions in applying the teachings of the present invention.

Figure 4:
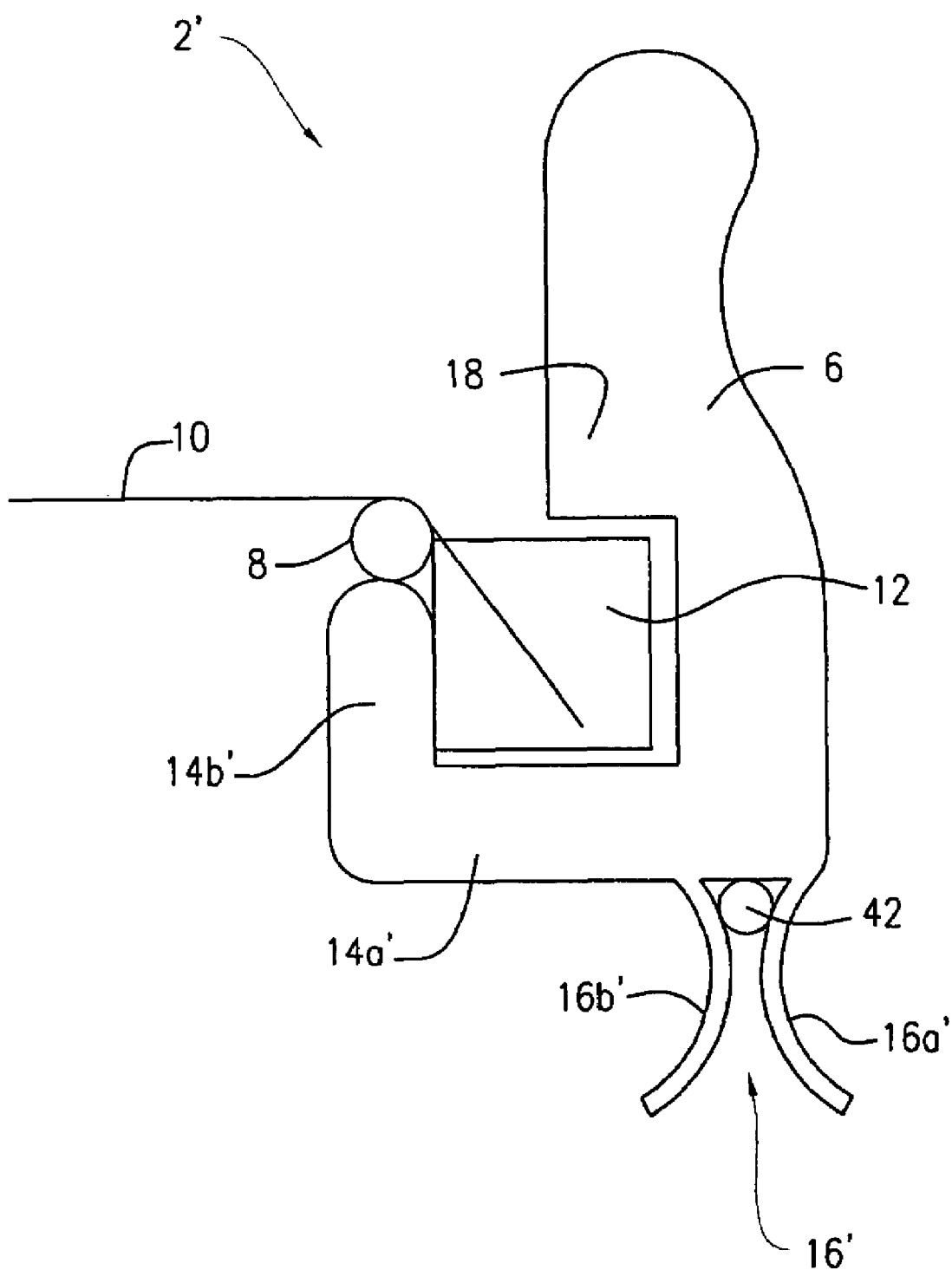
FIG. 4 is a cross sectional view of the practice drumhead assembly of the present invention with an alternative engagement configuration for mounting the practice drumhead on an acoustic drum.

In the alternative preferred embodiment of FIG. 4, an engagement member 6' having an alternative connection member 16' is shown. This alternative connection member 16' fits over the counter hoop 30 of an acoustic drum 22 (not shown), with element 16a' being formed to fit outwardly of at least a portion of the counter hoop 30 and element 16b' being formed to fit inwardly of at least a portion of the counter hoop 30. In its most preferred embodiment, a pressure sensitive adhesive 42 is placed within the elements 16a' and 16b' of the connection member 16' to securely hold the practice drumhead assembly 2' on the counter hoop 30.

Figure 5:
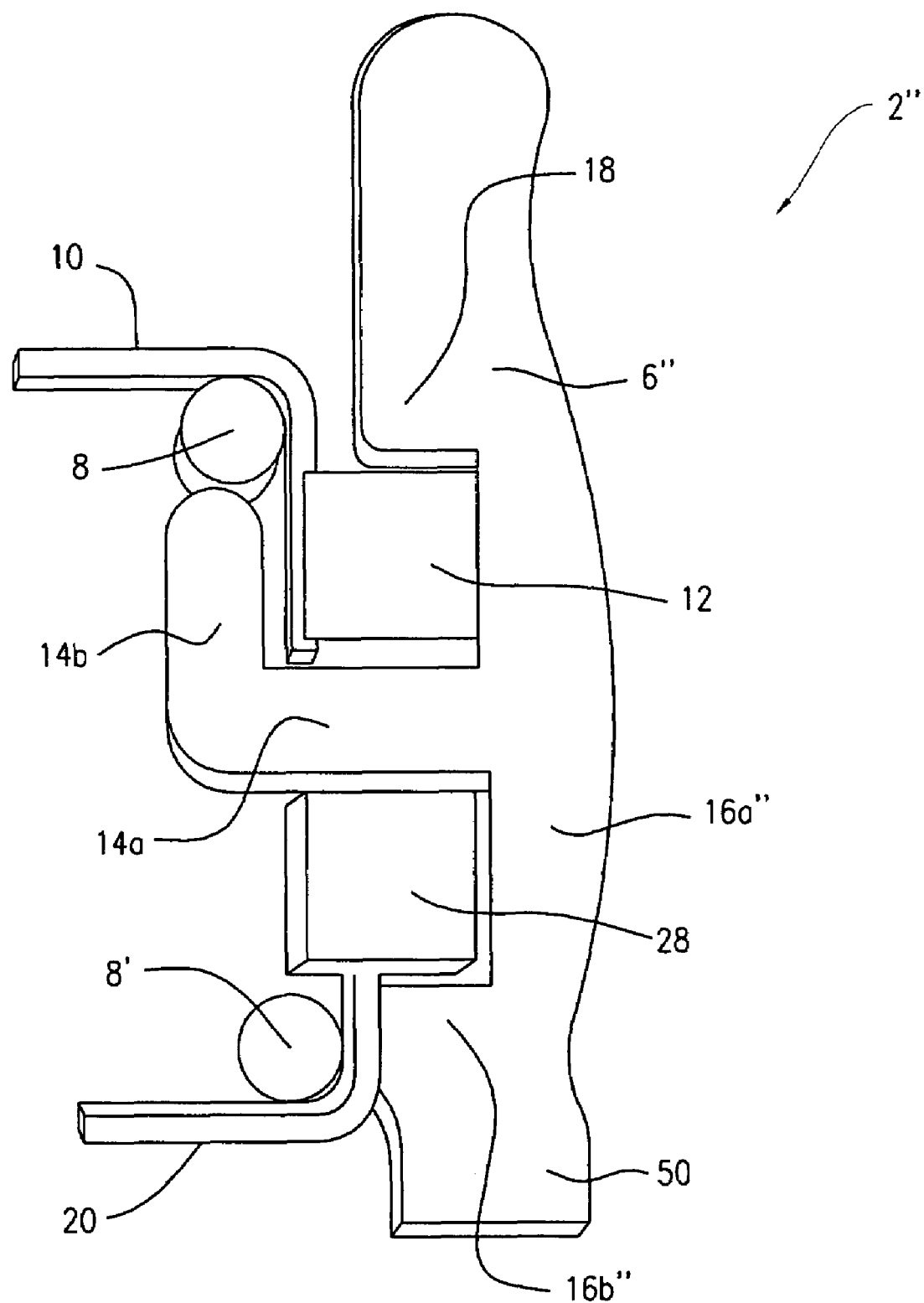
FIG. 5 is a cross sectional view of an alternative embodiment of the practice drumhead assembly of the present invention with an engagement configuration for mounting the practice drumhead directly on an acoustic drumhead, without the need for a standard acoustic drum.

In another alternative contemplated by the present invention, the practice drumhead assembly 2" can be used with an acoustic drumhead 26 that is not mounted on a drum shell 24. As shown in FIG. 5, the engagement member 6" is formed to receive the acoustic drumhead 26 in the connection member 16", with a vertical wall portion 16a" that fits around the outward perimeter of the annular frame 28 of the acoustic drumhead 26 and a connection member catch 16b" retaining the underside of the annular frame 28 of the acoustic drumhead 22.

Figure 6:
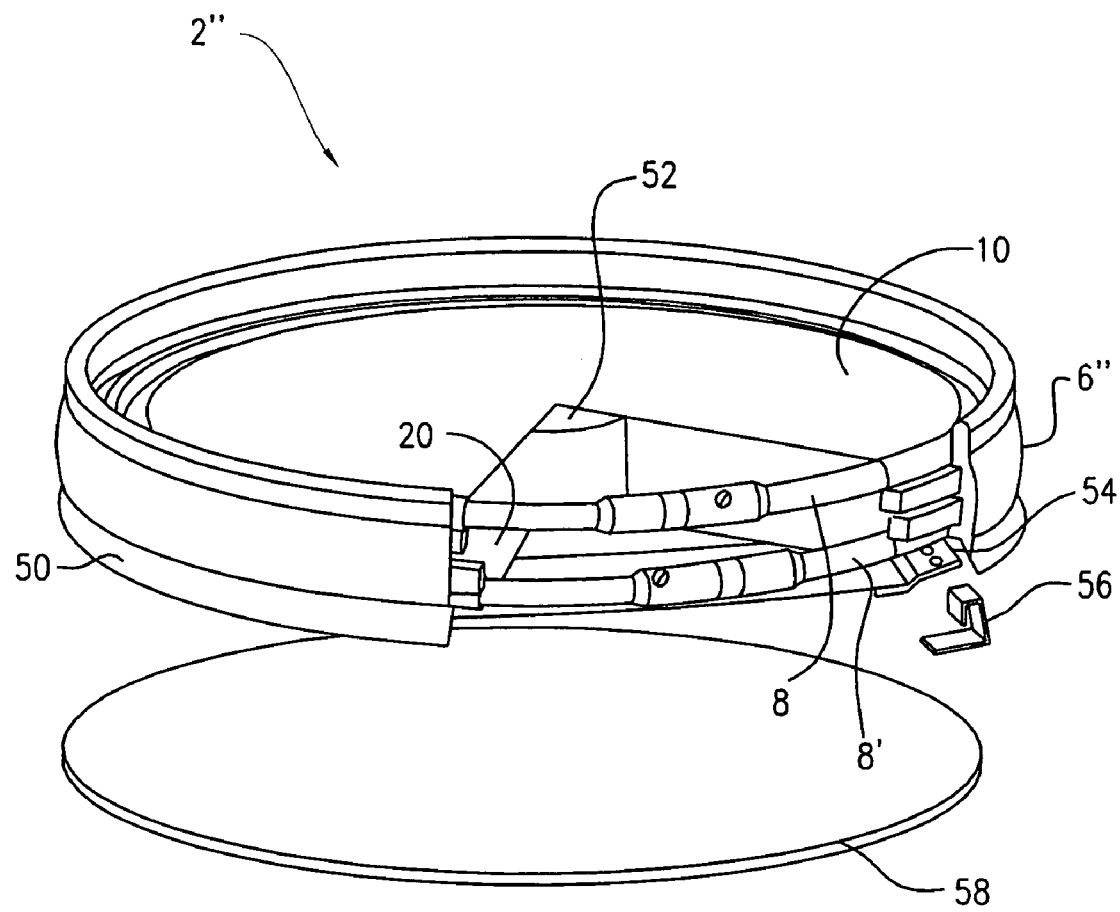
FIG. 6 is a partially exploded partially sectioned view of the practice drumhead assembly as shown in FIG. 5 configured for use as a snare.

As shown in FIGS. 5 and 6, the absence of the drum shell 24 over which an acoustic membrane 20 is usually stretched requires the use of a second annular tensioning ring 8' within the acoustic drumhead 26. The engagement member 6" terminates in an extension 50 at the lower portion to act as a base on which the practice drum assembly 2" can rest when being played.

The preferred embodiment for practicing a snare shown in FIG. 6 includes a poly fill damper 52 placed between the mesh membrane 10 and the acoustic membrane 20, a snare strainer 54 being held in place with strainer tension clips 56 and a sound absorbing plate 58. However, this embodiment provides portability and storage benefits due to the ability to practice without a drum shell 24.

As with the above embodiments, the engagement member 6" of the practice drum assembly 2" is preferably made of an elastomeric material. Additionally, the relationship between the amount of open area of the mesh practice membrane 10 to the substantially fixed distance between the mesh membrane 10 and the acoustic membrane 20, as well as the similar frequency of the mesh practice membrane 10 and the acoustic membrane 20, apply.

It is also understood that the present invention can be used to create an electric drum set, where sensors can be incorporated into the assembly to trigger a computer generated sound corresponding to where and how the mesh membrane is struck or the assembly 2 can be fitted with one or more microphones to pick up the sound being generated by the acoustic membrane 20.

Variations, modifications and alterations to the preferred embodiment of the present invention described above will make themselves apparent to those skilled in the art. All such changes are intended to fall within the spirit and scope of the present invention, limited solely by the appended claims.

All patents referred to herein are hereby incorporated by reference.

We claim:

1. A practice drumhead assembly comprising:
   a. a mesh membrane;
   b. a tensioning ring for tensioning the mesh membrane comprising a cylindrical rod formed in a circular, flat configuration and an expansion member comprising a turnbuckle for expanding the diameter of the tensioning ring, said tensioning ring being placed within the mesh membrane to outwardly tension the mesh membrane; and
   c. an engagement member comprising a retention member for retaining the mesh membrane and a connection member for retaining the mesh membrane in substantially fixed relation to an acoustic membrane.

2. The practice drumhead assembly of claim 1 wherein the connection member is formed to connect to one of the group comprising an annular frame of an acoustic drumhead, a counter hoop placed over the annular frame of an acoustic drumhead on a drum shell, one or more tensioning lugs on a drum shell and one or more tension rods on a drum shell.

3. The practice drumhead assembly of claim 2 wherein the connection member is adapted to attach to the annular frame of the acoustic drumhead.

4. The practice drumhead assembly of claim 2 wherein the connection member is adapted to attach to the counter hoop placed over the annular frame of an acoustic drumhead placed on a drum shell.

5. The practice drumhead assembly of claim 4 wherein the connection member further comprises a pressure sensitive adhesive for removably securing the practice drumhead assembly to the counter hoop.

6. The practice drumhead assembly of claim 1 wherein at least a portion of the engagement member is formed of an elastomeric material.

7. The practice drumhead assembly of claim 6 wherein the elastomeric material is rubber.

8. The practice drumhead assembly of claim 1 wherein the engagement member further comprises a stop member at an upper end thereof.

9. The practice drumhead assembly of claim 4 wherein the connection member comprises a portion for positioning outwardly of the counter hoop and a catch that extends inwardly below the inner perimeter of the counter hoop.

10. The practice drumhead of claim 1 wherein the cylindrical rod comprises a smooth end and a threaded end and the turnbuckle comprises a threaded receptacle for receiving the threaded end of the rod and a smooth receptacle for receiving the smooth end of the rod.

11. The practice drumhead assembly of claim 1 wherein the turnbuckle comprises a threaded turnbuckle which cooperates with the cylindrical rod.

12. The practice drumhead assembly of claim 1 wherein the mesh membrane has an open area of from about 25 to about 75%.

13. The practice drumhead assembly of claim 12 wherein the mesh membrane has an open area of about 30%.

14. The practice drumhead assembly of claim 1 wherein the mesh membrane is formed of a polyester material.

15. The practice drumhead assembly of claim 1 wherein the mesh membrane is retained in substantially fixed relation to the acoustic membrane at a distance of from about 0.5 to about 4 inches.

16. The practice drumhead assembly of claim 15 wherein the mesh membrane is retained in substantially fixed relation to the acoustic membrane at a distance of from about 0.5 to about 3 inches.

17. A practice drumhead assembly comprising:
a. a mesh membrane;
b. a tensioning ring for tensioning the mesh membrane; and
c. an engagement member comprising a retention member for retaining the mesh membrane and a connection member for retaining the mesh membrane in substantially fixed relation to an acoustic membrane, wherein the mesh membrane is formed in a practice drumhead having an annular frame for securing the mesh membrane and the retention member comprises a floor extending inwardly from an interior wall of the engagement member to support the bottom of the practice drumhead annular frame.

18. The practice drumhead assembly of claim 17 wherein the retention member further comprises a face extending upwardly from a portion of the floor to support the inner side of the practice drumhead annular frame.

19. A combination of a tensioning ring and a drumhead having a membrane and an annular frame, said tensioning ring comprising a cylindrical rod formed in a circular, flat configuration and an expansion member comprising a turnbuckle for expanding the diameter of the tensioning ring to outwardly tension the membrane, wherein the tensioning ring engages the membrane within the annular frame.

20. The combination of claim 19 wherein the cylindrical rod comprises a smooth end and a threaded end.

21. The combination of claim 20 wherein the turnbuckle has a threaded receptacle for receiving the threaded end of the rod and a smooth receptacle for receiving the smooth end of the rod.

22. A method of tensioning a drumhead having a membrane and an annular frame comprising the steps of:
a. inserting a tensioning ring comprising a cylindrical rod formed in a circular, flat configuration and an expansion member for expanding the diameter of the tensioning ring within the annular frame; and
b. activating the expansion member to expand the diameter of the tensioning ring against the membrane.

23. The method of claim 22 wherein the expansion member comprises a turnbuckle, wherein the step of activating the expansion member to expand the diameter of the tensioning ring comprises rotating the turnbuckle.

24. The method of claim 22 wherein the cylindrical rod comprises a smooth end and a threaded end.

25. The method of claim 24 wherein the expansion member comprises a turnbuckle having a threaded receptacle for receiving the threaded end of the cylindrical rod and a smooth receptacle for receiving the smooth end of the cylindrical rod.

* * * * *